Dec. 15, 1959  D. R. SCHURMAN  2,916,952
BALL HEADER
Filed Nov. 8, 1957  4 Sheets-Sheet 1

INVENTOR
Donald R. Schurman
BY
ATTORNEY

Dec. 15, 1959  D. R. SCHURMAN  2,916,952
BALL HEADER
Filed Nov. 8, 1957  4 Sheets-Sheet 2

INVENTOR
Donald R. Schurman
BY
Rockwell & Bartholow
ATTORNEYS

United States Patent Office 2,916,952
Patented Dec. 15, 1959

2,916,952
BALL HEADER

Donald R. Schurman, Thomaston, Conn., assignor to The Waterbury Farrel Foundry & Machine Company, Waterbury, Conn., a corporation of Connecticut Application November 8, 1957, Serial No. 695,299

7 Claims. (Cl. 78—41)

This invention relates to a ball header for a machine for making spherical balls for ball bearings or the like.

In many so-called heading devices where a reciprocable gate is employed to carry the tools to cooperate with a die supported upon the bed of the machine, a plurality of, usually two, punches are provided upon the gate, and these punches are shifted during the reciprocation of the gate so that first one punch and then the other will register with the die and perform work upon the blank. This is usually the case where two operations at least are required to perform the desired work. In the present instance, however, spherical balls may be made in a single operation and hence only one punch is provided upon the gate.

However, such machines in the past have been relatively slow in that usually the gate is reciprocated only once during a complete revolution of the crank shaft which operates the gate so that, upon each revolution of the crank shaft, only one ball is produced. The present device is adapted to operate at an increased speed in that, while the gate is actuated by a crank shaft, the actuating mechanism includes, a toggle operated by a pitman in turn actuated by the crank shaft so that a stroke of the gate is effected both upon the upward break of the toggle arms and upon the lower break thereof, and thus two reciprocations of the gate result from each complete revolution of the crank shaft.

As this would require a blank or workpiece to be cut off and fed to the die at each stroke of the gate, it would be difficult to secure sufficiently rapid operation of the cut-off and transfer mechanism to deliver a workpiece to the working die at each stroke of the gate or at each half revolution of the crank shaft if the gate is reciprocated at high speed. To this end the machine is so designed that a length of stock may be fed in at each side of the working die and two cut-off mechanisms are employed, these mechanisms alternating to cut off a blank and feed it to the working die. Hence double the amount of work can be done as each cut-off mechanism can be operated at the usual speed employed in machines where only one cut-off mechanism was used.

These two workpieces will be cut from the rod stock and delivered to the die where only one was previously cut off and delivered, thus doubling the output of the machine although the crank shaft would not be driven at an excessive speed as each rotation of the crank shaft effects two reciprocations of the gate and the punch carried thereby.

One object of the invention is to produce a heading apparatus for making balls or similar articles which may have a large output.

A further object of the invention is the provision of a machine of the character described wherein a single die and punch is provided but in which a workpiece will be fed to the die alternately from each side thereof so that the output of the machine will be double that which would be the case if the blanks were fed from only one side.

A still further object of the invention is to provide novel and simple means for operating the gate which carries the working punch in a machine for making balls or similar articles at a relatively high speed.

Still another object of the invention is to provide simple and improved knock-out means to eject the work from the die and punch in a ball header designed to operate at a speed greatly increased as compared with those previously in use.

To these and other ends the invention consists in the novel features and combinations of parts to be hereinafter described and claimed.

Figure 2:
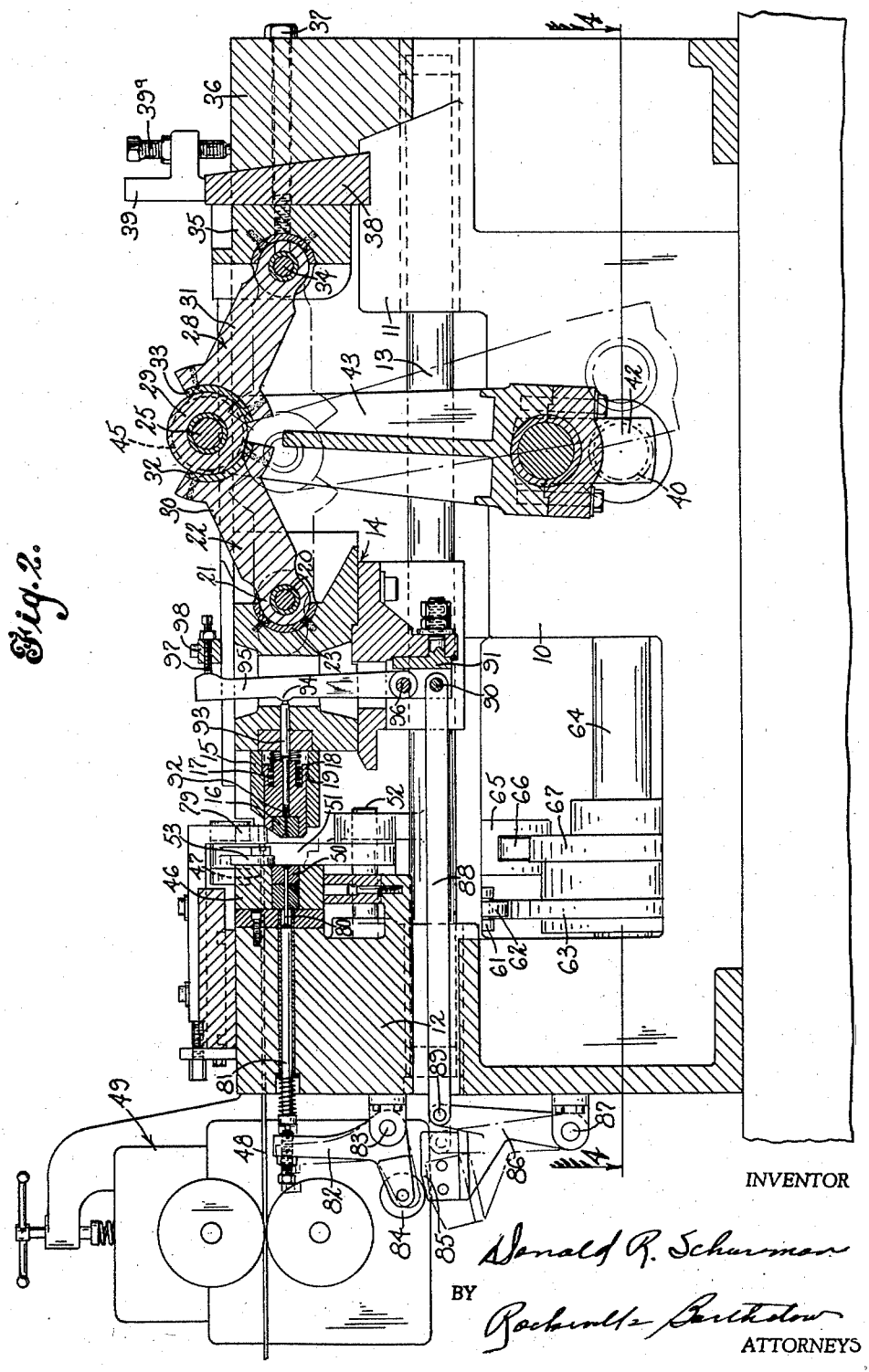
Fig. 2 is a longitudinal sectional view on line 2—2 of Fig. 1.

As illustrated, particularly in Fig. 2, the apparatus comprises a main frame 10 having upstanding portions 11 and 12 at the ends thereof. Slidably mounted in the members 11 and 12 are a pair of slide rods 13 to which is secured a gate 14 which carries a punch holder 15. Within the punch holder is slidably mounted a punch 16 urged forwardly by a coil spring 17, the forward movement of the punch being limited by a shoulder 18 thereon adapted to lodge against a cooperating interior shoulder 19 on the punch holder.

Secured to the gate is a transverse pivot rod 20 upon which is pivoted the knuckle 21 at the forward end of a toggle link 22. The knuckle 21 may bear against an arcute bearing plate 23 mounted in the gate.

A pivot pin 25 pivotally connects knuckles 26 upon the rear end of the link 22 to knuckles 27 (Fig. 1) upon the forward end of a toggle link 28, and upon this pin is mounted a roller 29 to receive the thrust of centrally disposed arms 30 and 31 which are parts respectively of the links 22 and 28. Wear plates 32 and 33 are provided between the arms and the roller 29.

The rear end of the toggle 28 is pivotally connected as shown at 34 to a block 35 adjustably connected to a frame part 36 (carried by the member 11) by screws 37 (Figs. 1 and 2) so that the position of the pivot point 34 may be adjusted. A wedge-shaped member 38 is disposed between the members 35 and 36, this member being vertically adjustable by the adjusting screw 39ª carried by a bracket 39 secured to the wedge member 38 and bearing against the upper surface of the frame part 36. It will be apparent that when the screws 37 are loosened, adjustment of the wedge will adjust the pivot block 35 in a forward and rear direction to adjust the position of the pivot 34. After such adjustment the screws 37 can be tightened to hold the parts securely in place.

Figure 1:
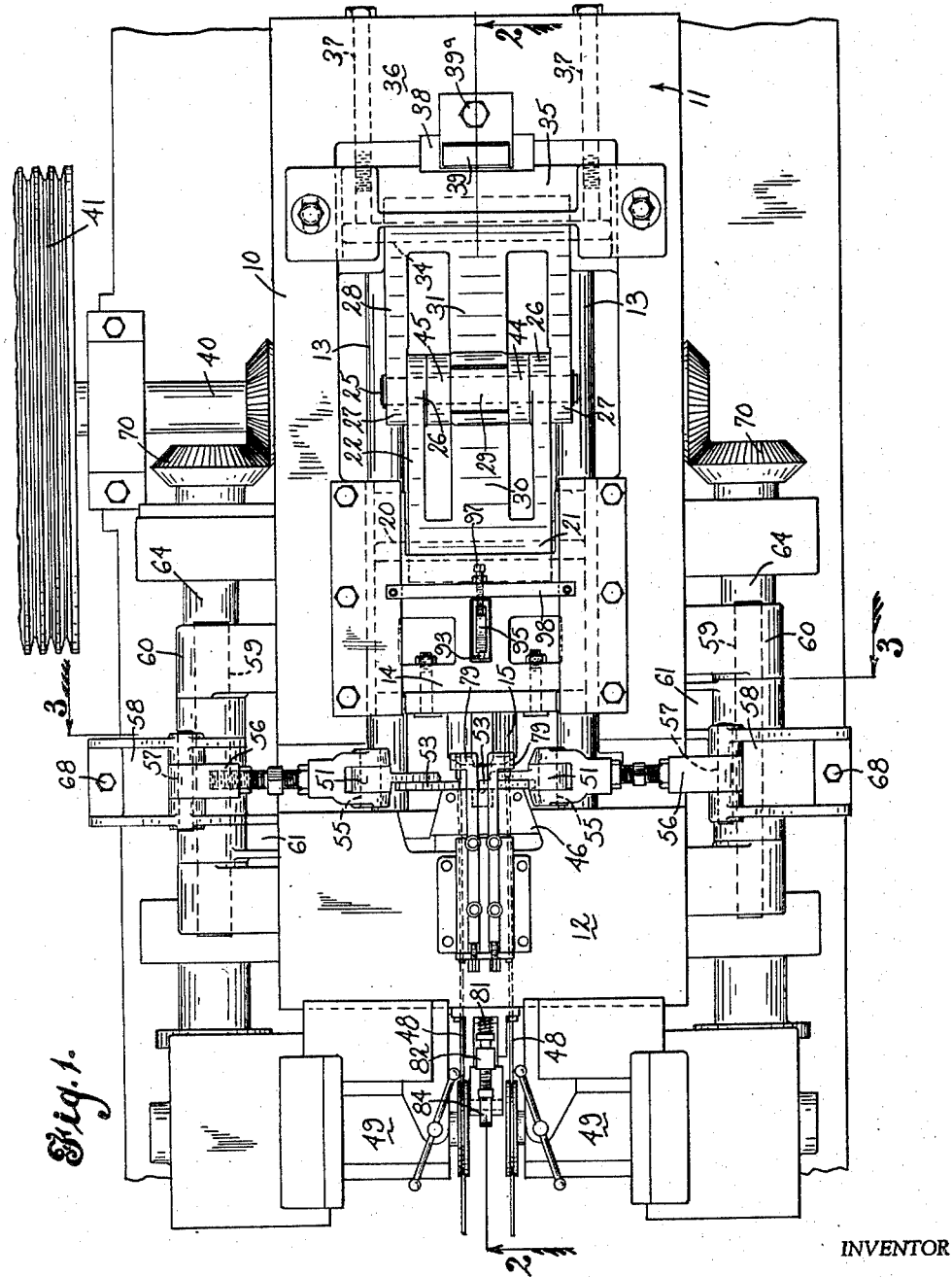
Fig. 1 is a top plan view of a ball header embodying my invention.
Figure 4:
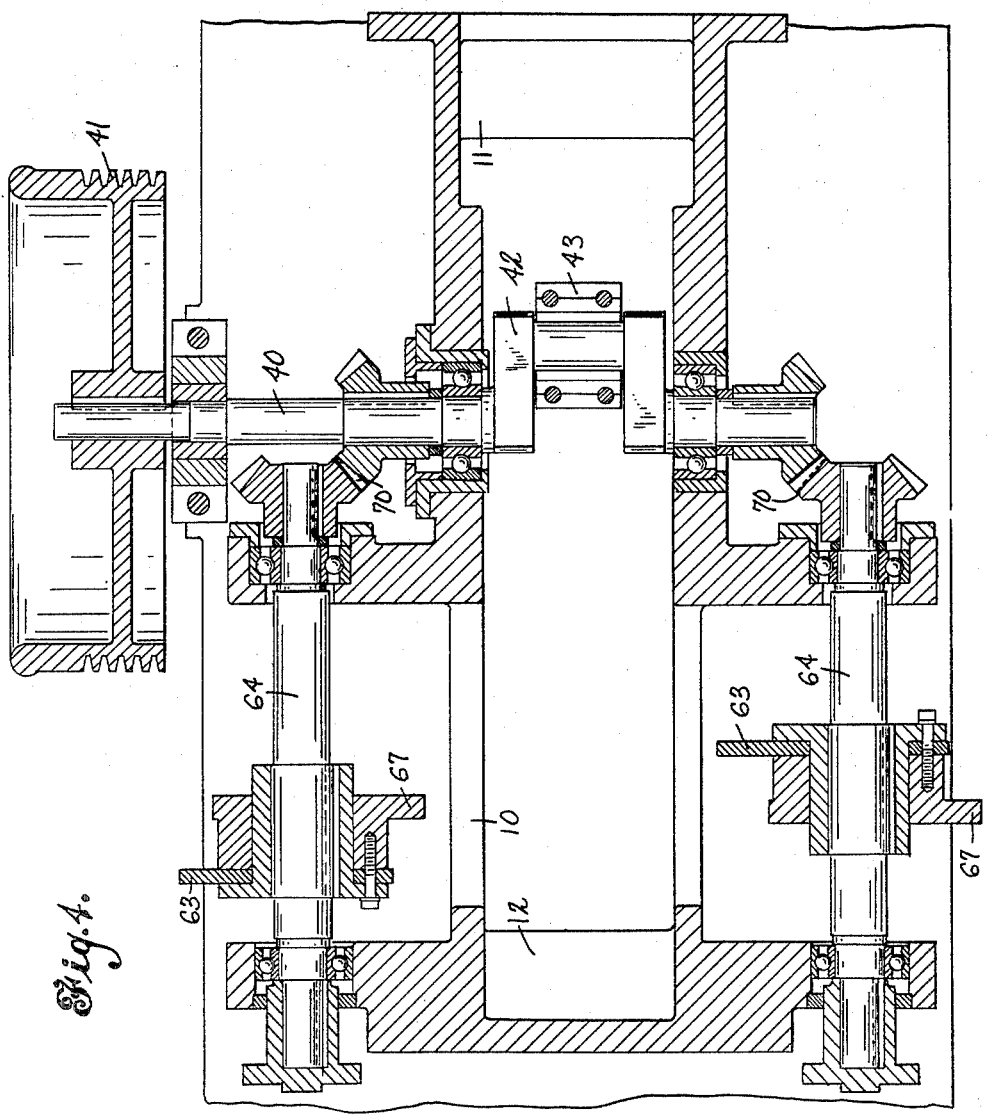
Fig. 4 is a horizontal sectional view on line 4—4 of Fig. 2, showing the operating mechanism.

Mounted in the bed 10 is a transversely extending crank shaft 40 rotated by the pulley 41 from any convenient source of power (Fig. 4). This shaft has a crank portion 42 upon which is mounted a pitman 43. It will be noted that this crank shaft is mounted in the bed of the machine below the gate and associated mechanism, and the pitman 43 extends upwardly, as shown in Figs. 1 and 2, where it is bifurcated and provided with a pair of knuckles 44 and 45 (Fig. 1) which receive the pivot pin 25 of the toggle links 22 and 28. When the crank shaft is reciprocated the pivot pin 25 will be moved in a substantially vertical plane, thus carrying the pivot pin 25 to positions above and below that in which the toggle links are aligned and breaking the toggle in both directions. As the pivot pin 34 is fixed during the operation of the device, this will result in reciprocation of the gate 14 and, as the gate will be moved forwardly each time the pivot pin 25 is moved toward dead-center position, a stroke of the gate will be effected for each upward and downward movement of the toggle links which will result in two forward strokes of the gate for each rotation of the crank shaft 40. The parts are so proportioned that the movement of the pivot pin 25 above its central position is equal to that which occurs below its central position so that even strokes of the gate are obtained upon movement of the pitman in either direction.

Upon the portion 12 of the bed (Fig. 2) is mounted a die block 46 having a pair of spaced openings 47 which serve as cut-off dies or stations and through each of which a length of rod stock 48 may be fed by the feeding mechanisms designated generally by the numerals 49. The openings 47 also extend through the frame 12 to receive the stock and thus two lengths of stock are fed to the machine during its operation, the timing being such that the two feeding mechanisms work alternately so that work blanks will be cut from first one length of stock and then the other and fed to the working die to be hereinafter described.

In the die block 46 is mounted a working die 50 with which the punch 16 cooperates to form the balls or other articles for which the machine is designed. It will be noted from Fig. 3 that this die lies below and midway between the cut-off stations 47, and means are provided to cut workpieces from the wire or rod stock 48 and deliver them to the working die 50.

Figure 3:
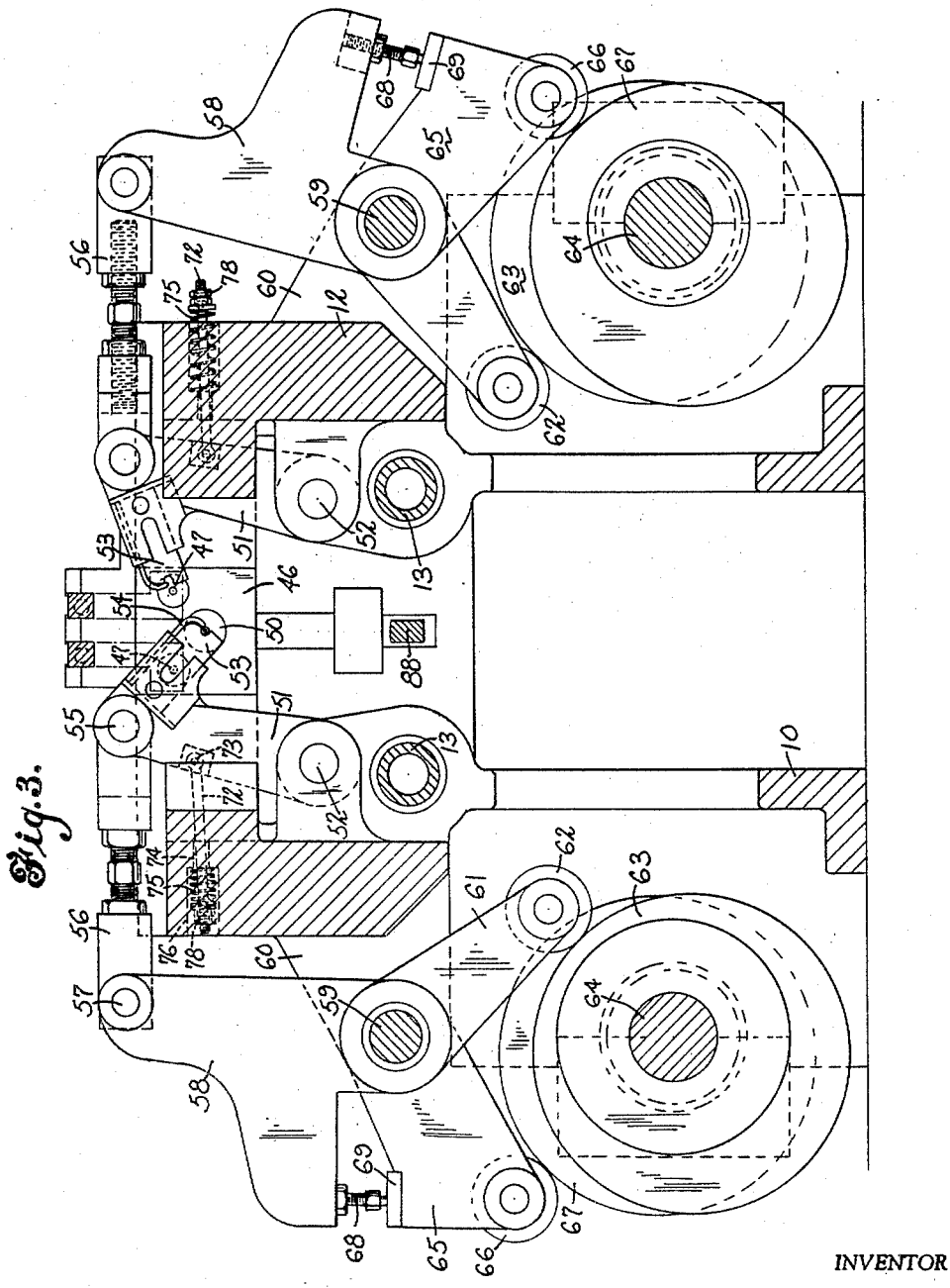
Fig. 3 is a transverse sectional view on line 3—3 of Fig. 1.

This mechanism is shown more especially in Fig. 3 wherein arms 51 are pivoted at 52 to the frame, one upon each side thereof, these arms carrying cutters 53, each of which is provided with a gripping finger 54 adapted to engage the severed workpiece and transfer it to the working die. It will be understood that this cut-off and transfer mechanism is duplicated at each side of the machine so that a description of one thereof will suffice for both. To the arms 51 are pivoted at 55 adjustable links 56 pivoted at 57 to a lever 58 which is in turn pivoted at 59 to a bracket 60 carried by the frame. The lever 58 has a downwardly inclined arm 61 which carries a follower roller 62 adapted to be engaged by the periphery of a cam 63 mounted upon a side shaft 64 (Figs. 3 and 4). Also pivoted at 59 to the bracket 60 is a lever 65 having a cam follower 66 adapted to be engaged by a cam 67 also secured upon the side shaft 64. A screw 68 adjustably secured to the lever 58 bears upon a breaker plate 69 secured to the lever 65.

The shaft 64 is actuated by gearing 70 from the crank shaft 40, and it will be apparent that, as the cams 63 and 67 are rotated, the link 56 will be positively moved in opposite directions, the cam 67 effecting the operative or cut-off stroke of the knife while the cam 63 effects the withdrawal of the knife from the work die to a point beyond the cut-off station. As illustrated in Fig. 3, the cut-off mechanism is shown at the end of its operative stroke at the left and at the end of its inoperative stroke at the right.

A link 72 may be pivoted at 73 to each of the arms 51 (Fig. 3), these links passing loosely through openings 74 in the frame and being urged outwardly by compression springs 75 mounted in recesses 76 in the frame. The springs bear against the bottoms of the recesses at one end and against nuts 78 adjustably threaded upon the link 72 at the other end. These links will be urged in an outward direction by the springs 75 so as to urge the arms 51 outwardly.

A work stop consisting of an L-shaped member 79 is provided for each of the cut-off stations, these work stops being adjustably secured to the frame part 12. Each of the lengths of stock 48 will be fed forwardly against the work stop to determine the length of the workpiece to be cut therefrom. It will be understood that the feed mechanism 49 may also be driven from the shafts 64 so that the feed will be properly timed with the operation of the cut-off and transfer mechanisms. The latter will, as stated, be alternately actuated to move inwardly to cut off a workpiece and transfer it to the working die 50, this timing being effected by proper disposition of the cams 63 and 67. It will be apparent that upon each rotation of the shafts 64, which shafts are rotated in synchronism with the crank shaft 40, two workpieces will be cut off and fed to the working die and, as two strokes of the gate are effected for each rotation of the crank shaft, two finished balls or other articles will be delivered by the machine for each rotation of the crank shaft instead of one as was previously the case.

In devices of this character the work sometimes clings to the die and sometimes to the punch, and in the present apparatus knock-out mechanism is provided to eject the work from the die and also from the punch.

To this end a knock-out pin 80 (Fig. 2) is provided in the working die 50, this pin being actuated by a punch 81 slidably mounted in the frame part 12, the outer end of which is engaged by the arm 82 of a bell crank lever pivoted to the frame at 83. The other arm of this bell crank lever carries a cam follower roller 84 adapted to be engaged by the face of a cam 85 carried on a lever 86 pivoted to the frame at 87. One end of a link 88 is pivoted at 89 to the lever 86, and the other end of this link is pivoted at 90 to a bracket 91 carried by the gate 14. It will be seen that as the gate is reciprocated, the lever 86 will be oscillated and the cam member 85 acting upon the cam roller 84 will rock the lever 82 in a clockwise direction upon the withdrawal of the gate 14 to the right, as shown in Fig. 2, so as to move the knock-out pin 80 forwardly and eject the work from the work die upon the withdrawal of the gate.

If the work tends to remain in the punch 16, it will be ejected therefrom upon the withdrawal of the gate by means of the knock-out pin 92 mounted in the punch 16 and actuated by a plunger 93 slidably mounted in the punch. This plunger 93 is adapted to be engaged by a boss 94 on a lever 95 pivoted at 96 to the bracket 91 to which the link 88 is pivoted as was previously described. The upper end of the lever 95 is adapted to engage a stop screen 97 adjustably carried by a plate 98 fixed to the frame so that, while the stop screw 97 may be threadedly adjusted with respect to the frame, it remains fixed during the operation of the device.

With this construction it will be seen that when the gate moves forwardly from its position shown in Fig. 2, the upper end of the lever 95 will be disengaged from the stop screw 97 and, therefore, permits the knock-out pin 92 to be retracted or moved to the right with respect to the punch 16. However, upon withdrawal movement of the gate or movement to the right, as shown in Fig. 2, the upper end of the lever 95 will engage the stop screw 97 as shown in this figure and arrest the movement of the lever 95, plunger 93 and knock-out pin 92. Continued movement of the gate, while the movement of the knockout pin is arrested, will eject the work from the punch.

While I have shown and described a preferred embodiment of my invention, it will be understood that it is not to be limited to all of the details shown, but is capable of modification and variation within the spirit of the invention and within the scope of the claims.

What I claim is:

1. In a header or like machine, a frame, a work die carried thereby, a gate reciprocably mounted on the frame carrying a punch to cooperate with the die, a pair of cut-off dies on the frame spaced from the work die, means for feeding a length of stock to each of said cut-off dies, a pair of movable severing members carried by the frame, one associated with each of said cut-off dies to cut a workpiece from a length of stock and carry it to the work die, means for alternately actuating said cut-off members including a main shaft extending transversely of the frame, and a pair of cam shafts extending longitudinally of the frame and actuated directly from, and at the same rotational speed as, the crank shaft, each of said cam shafts having cam means thereon to actuate one of said cut-off mechanisms.

2. In a header or like machine, a frame, a work die carried thereby, a gate reciprocably mounted on the frame carrying a punch to cooperate with the die, a pair of cut-off dies on the frame spaced from the work die, means for feeding a length of stock to each of said cut-off dies, a pair of movable severing members carried by the frame, one associated with each of said cut-off dies to cut a workpiece from a length of stock and carry it to the work die, means for alternately actuating said cut-off members including a main shaft extending transversely of the frame, a pair of cam shafts extending longitudinally of the frame and actuated directly from, and at the same rotational speed as, the crank shaft, each of said cam shafts having cam means thereon to actuate one of said cut-off mechanisms, and means connecting said main shaft to the gate to effect two advances thereof during each rotation of the main shaft.

3. In a header or like machine, a frame, a work die carried thereby, a gate reciprocably mounted on the frame carrying a punch to cooperate with the die, means to cut a workpiece from a length of stock and deliver it to the die, a knock-out punch reciprocably mounted in the die bed to eject the work from the die, and means for actuating said punch comprising a link connected to the gate to be reciprocated thereby, cam means pivotally mounted on the frame and connected to the knock-out punch to actuate the same, and means connecting said link to said cam means to actuate the latter.

4. In a header or like machine, a frame, a work die carried thereby, a gate reciprocably mounted on the frame carrying a punch to cooperate with the die, means to cut a workpiece from a length of stock and deliver it to the die, a knock-out punch reciprocably mounted in the die bed to eject the work from the die, means for actuating said punch comprising a link reciprocably mounted in the frame and connected to the gate for actuation thereby, a cam member pivoted on the frame and connected to the link, and a lever pivoted to the frame and actuated by said cam member, said lever engaging said punch to advance it to eject the work.

5. In a header or like machine, a frame, a work die carried thereby, a gate reciprocably mounted on the frame carrying a punch to cooperate with the die, means to cut a workpiece from a length of stock and deliver it to the die, a knock-out punch reciprocably mounted in the die bed to eject the work from the die, means for actuating said punch comprising a link reciprocably mounted in the frame and connected to the gate for actuation thereby, a cam member pivoted on the frame and connected to the link and a lever pivoted to the frame having a cam follower roller mounted thereon to be engaged by said cam member, and said lever engaging said punch to advance it to eject the work.

6. In a header or like machine, a frame, a work die carried thereby, a gate reciprocably mounted on the frame carrying a punch to cooperate with the die, means to cut a workpiece from a length of stock and deliver it to the die, a knock-out punch reciprocably mounted in the die bed to eject the work from the die, means for actuating said punch comprising a link reciprocably mounted in the frame and connected to the gate for actuation thereby, a lever mounted on the frame in position to engage said punch and having a cam follower thereon, a cam lever pivoted to the frame and connected to said link to be actuated thereby, and cam means on said cam member to engage said follower.

7. In a header or like machine, a frame, a work die carried thereby, a gate reciprocably mounted on the frame carrying a punch to cooperate with the die, a pair of toggle links pivoted together at their adjacent ends and having their remote ends pivoted to the frame and gate respectively, means for moving said links in both directions from a neutral position including a rotatable crank shaft mounted in the frame below the level of the gate, a cut-off mechanism at each side of the die to cut a workpiece and carry it to the die, a pitman connecting the crank shaft to the pivoted adjacent ends of the toggle links to move the latter in both directions from a dead-center position to advance the gate twice during each rotation of said shaft, means to rotate said shaft, and means to effect actuation of said cut-off mechanisms directly from the crank shaft, one during each advance of the crank shaft.

References Cited in the file of this patent

UNITED STATES PATENTS

| | | |
|---|---|---|
| Re. 9,027 | Upham | Jan. 6, 1880 |
| 182,962 | Ruddick | Oct. 3, 1876 |
| 1,405,174 | Wilcox | Jan. 31, 1922 |
| 1,478,314 | Wilcox | Dec. 18, 1923 |
| 1,797,702 | Pierre | Mar. 24, 1931 |
| 1,914,514 | Lapham | June 20, 1933 |
| 1,921,655 | Burbank | Aug. 8, 1933 |
| 2,187,479 | Zwierlein | Jan. 16, 1940 |
| 2,271,257 | Friedman | Jan. 27, 1942 |
| 2,362,970 | Bolland | Nov. 21, 1944 |
| 2,595,433 | Wilcox | May 6, 1952 |
| 2,599,053 | Friedman | June 3, 1952 |
| 2,639,632 | Criley et al. | May 26, 1953 |
| 2,784,427 | Wright | Mar. 12, 1957 |

FOREIGN PATENTS

| | | |
|---|---|---|
| 733,052 | Germany | Mar. 18, 1943 |